United States Patent Office 2,937,125
Patented May 17, 1960

2,937,125

PREPARATION OF CHLOROMETHYL DIENES

Morris B. Berenbaum, Levittown, Pa., assignor to Thiokol Chemical Corporation, Trenton, N.J., a corporation of Delaware No Drawing. Application November 5, 1957
Serial No. 694,494

5 Claims. (Cl. 204—163)

This invention relates to chloromethyl dienes and to a method of their preparation by chlorination of methyl-substituted dienes in the vapor phase and under the influence of actinic light.

It is well known that methyl-substituted dienes, such as isoprene, have a pronounced tendency to chlorinate by substitution and addition, particularly when reaction takes place while the diene is in the liquid state. Such chlorinations occur on the carbon atoms of the diene chain, not on the methyl substituents attached to the chain.

In accordance with the method of the invention, however, the alkyl substituent or substituents of alkyl-substituted dienes such as isoprene, dimethyl butadiene and methyl pentadiene can be halogenated by carrying out the reaction in the vapor phase while the reactants are exposed to actinic light. The resulting halogenated products are distinguished by distinctly allylic characteristics and are useful as monomers that are polymerizable to hydrocarbon solvent-resistant polymers having active halogen atoms through which the polymers can readily be cured.

The reaction involved in the method of the invention is illustrated by the chlorination of isoprene to 2-chloromethyl butadiene 1,3:

(I)

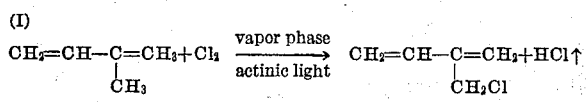

In carrying out the reaction set forth in Equation I, it is important that the isoprene be in the vapor phase when it is brought into contact with chlorine vapor for reaction upon exposure to actinic light. Failure to observe this precaution would result in substitution or addition of chlorine on the carbon chain in preference to substitution on the methyl group.

It is to be understod that in order to perform the reaction in the vapor phase, appropriate temperature and pressure conditions must prevail in the reaction zone. Thus, for example, if the reaction is performed at atmospheric pressure, the temperature of isoprene must be raised to its boiling point in order to convert it into the vapor phase. The isoprene vapors are brought into contact with chlorine gas while exposed to actinic light and the higher boiling chloromethyl butadiene so produced is condensed and removed from further contact with chlorine. While there is no known operable maximum temperature of reaction, it has been found that optimum yields and purity of product with minimum premature polymerization thereof are obtainable at temperatures ranging from the boiling point of the lowest boiling reactant to a temperature at which appreciable polymerization begins to take place or the density of the vapors becomes unduly diminished and thereby reduces the reaction rate. In the chlorination of isoprene, for example, optimum results at atmospheric pressure are obtainable at temperatures between 35° C., the boiling point of isoprene, and about 80 to 90° C.

It is advantageous also, for avoiding undesirable side reactions, to carry out the method under an inert atmosphere such as nitrogen, to operate in the presence of a polymerization inhibitor, to supply diene vapors to the reaction zone in stoichiometric excess, and to avoid unnecessary contact between chlorine gas and condensed chloromethyl diene or unreacted diene after leaving the reaction zone.

The reaction may be conducted in a continuous manner or batchwise so long as the precautions of bringing the chlorine into contact with diene in the vapor state while exposed to actinic light are observed. Batchwise, the method may, for example, be carried out by heating the diene to reflux temperature and introducing chlorine gas into the reflux column while exposing the reactants to actinic light and preferably also controlling the flow of chlorine gas so that a minimum will pass unreacted through the column. Any unreacted chlorine gas that leaves the column or the zone of exposure to actinic light is removed as expeditiously as possible to avoid contact with the chloromethyl diene product or with unreacted diene.

The advantages and utility of the invention will become further apparent from the following example included to illustrate the best mode now contemplated for practicing the invention.

Example

Freshly distilled isoprene containing 2% by weight para-tertiary butyl catechol as polymerization inhibitor was heated under nitrogen to the reflux temperature of 35° C. The isoprene vapors were passed into a chlorination tower exposed to ultra-violet light and provided, a short distance beyond the inlet for the isoprene vapors, with an inlet for chlorine gas. The reaction product and excess unreacted isoprene were removed and condensed and the flow of chlorine was controlled to reduce effluence of chlorine gas from the reaction zone to a minimum. During the course of the reaction, the pot temperature of the isoprene was gradually raised from 35° C. to about 60° C., whereupon the operation was concluded.

The condensed products were subjected to atmospheric distillation to remove unreacted isoprene and then to repeated fractional distillation under vacuum for separation of 2-chloromethyl butadiene. The 2-chloromethyl butadiene thus obtained had the following physical properties:

Boiling point _____ 30.5° C./48 mm.–34° C./45 mm.
Refractive idex at 25° C. _____ 1.4630
Chlorine content:
    Found _____percent__ 33.9
    Theoretical _____do____ 34.3
Molecular weight:
    Found _____ 99
    Theoretical _____ 102.0

It is to be expected that modifications of the method of the invention and particularly of the specific method set forth in the example will readily become apparent to those skilled in the art upon reading this description. All such modifications are intended to be included within the scope of the invention as defined in the appended claims.

I claim:

1. Method which comprises bringing together, in the vapor phase and under the influence of actinic light, chlorine gas and a methyl-substituted diene for reaction to form a chlorinated diene.

2. Method which comprises bringing together, in the vapor phase, at a temperature between 35 and about 90° C. and under the influence of ultra-violet light, chlorine gas and isoprene for reaction to form 2-chloromethyl butadiene 1,3.

3. A method as in claim 1 wherein an inert atmosphere is additionally present.

4. A method as in claim 1 wherein a polymerization inhibitor is additionally present.

5. A method as in claim 1 wherein said methyl-substituted diene is present in excess.

References Cited in the file of this patent

UNITED STATES PATENTS

| | | |
|---|---|---|
| 1,950,440 | Jacobson | Mar. 13, 1934 |
| 1,950,441 | Carothers et al. | Mar. 13, 1934 |
| 2,490,753 | Hill et al. | Dec. 6, 1949 |
| 2,537,630 | Reid | Jan. 9, 1951 |

FOREIGN PATENTS

| | | |
|---|---|---|
| 757,277 | Great Britain | Sept. 19, 1956 |

OTHER REFERENCES

Chemical Abstracts, vol. 28, column 5399 (5), September 10, 1934.

Chemical Abstracts, vol. 38, column 3248 (5), July 10, 1944.